(12) United States Patent
Kratzer et al.

(10) Patent No.: US 8,181,601 B2
(45) Date of Patent: May 22, 2012

(54) PET LITTER BOX

(76) Inventors: Oliver Clemens Robert Kratzer, Darlinghurst (AU); Grant Stevens, Surry Hills (AU)

(*) Notice: Subject to any disclaimer, the term of this patent is extended or adjusted under 35 U.S.C. 154(b) by 282 days.

(21) Appl. No.: 11/995,273

(22) PCT Filed: Jul. 10, 2006

(86) PCT No.: PCT/AU2006/000960
§ 371 (c)(1),
(2), (4) Date: Dec. 15, 2008

(87) PCT Pub. No.: WO2007/006082
PCT Pub. Date: Jan. 18, 2007

(65) Prior Publication Data
US 2009/0199778 A1    Aug. 13, 2009

(30) Foreign Application Priority Data
Jul. 11, 2005    (AU) .............................. 2005903665

(51) Int. Cl.
*A01K 29/00* (2006.01)

(52) U.S. Cl. ....... 119/165; 119/161; 119/168; D30/161; D30/162

(58) Field of Classification Search .................. 119/161, 119/165, 166, 168, 170, 167, 452, 453, 479, 119/482, 483, 496; D30/161, 162, 108, 109; 294/1.3
See application file for complete search history.

(56) References Cited

U.S. PATENT DOCUMENTS

| | | | |
|---|---|---|---|
| 5,042,430 A * | 8/1991 | Casmira | 119/165 |
| 5,134,974 A * | 8/1992 | Houser | 119/168 |
| 5,329,878 A | 7/1994 | McCauley | |
| 5,329,879 A | 7/1994 | Walton | |
| D361,175 S * | 8/1995 | VanSkiver | D30/161 |
| 5,531,186 A * | 7/1996 | Flood et al. | 119/166 |
| 5,713,302 A | 2/1998 | Walter | |
| 5,855,186 A * | 1/1999 | Larsen et al. | 119/166 |
| 5,924,383 A * | 7/1999 | Smith | 119/165 |
| 6,298,808 B1 * | 10/2001 | Crafton et al. | 119/165 |
| 7,036,458 B1 * | 5/2006 | Stornant | 119/496 |
| 2003/0217700 A1 | 11/2003 | Northrop et al. | |
| 2004/0129233 A1 * | 7/2004 | Northrop et al. | 119/166 |
| 2004/0261727 A1 | 12/2004 | Matsuo et al. | |
| 2005/0076844 A1 * | 4/2005 | Lakela | 119/165 |
| 2006/0005777 A1 * | 1/2006 | Galindo et al. | 119/165 |
| 2008/0022938 A1 * | 1/2008 | Callan | 119/165 |

\* cited by examiner

*Primary Examiner* — Andrea Valenti (74) *Attorney, Agent, or Firm* — Connolly Bove Lodge & Hutz LLP (57) ABSTRACT

A pet litter device which includes a tray to contain pet litter, a pivoting lifting handle connected to the tray to assist in emptying used pet litter, a ramp connectable to the tray to allow ingress and egress to the tray, a skirt adapted to be attached to the perimeter of the tray and having an opening corresponding to the position of the ramp plus an optional sifting scoop for removing pet litter detachably mounted on the underside of the ramp. The upper surface of the ramp is covered in a fabric that cleans the paws of the pet. The pivoting handle, spans the width of the tray and is foldable to encompass one end of the tray, and a single fixed handle is provided at the other end of the tray and the ramp clamps onto the fixed handle. The skirt ramp and scoop are injection molded together and are detachably connected together prior to assembly with the tray. The injection molded skirt ramp and scoop nest with the tray prior to assembly for ease of storage and display in retail outlets.

7 Claims, 16 Drawing Sheets

PET LITTER BOX

CROSS REFERENCE TO RELATED APPLICATIONS

This application is a national phase of PCT/AU2006/000960, filed on Jul. 10, 2006, which claims priority to AU 2005903665, filed Jul 11, 2005, the entire contents of all are hereby incorporated by reference.

This invention relates to pet litter-boxes, specifically for containing and dispensing the pet litter particularly cat litter.

BACKGROUND TO THE INVENTION

Pet litter is commonly used to absorb urine and faecal matter from cats. Clumping litter is said to be the most effective and popular of the types of pet litter available. Clumping litter solidifies wet excrement and deodorizes solid waste matter. The remains of the excrement can be removed from the container with a scoop.

Devices to contain and dispense pet litter are extensively known in the art, and are often referred to as litter trays. Liners are often used inside litter trays to prevent the tray from having direct contact with the litter and cat faecal matter.

Some litter trays do not have protection from cat urine around the perimeter, therefore when emptying the tray the user must wear gloves before handling the tray to avoid contact with the cat urine.

U.S. Pat. No. 5,329,879 discloses a litter box with high sidewalls and a ramp leading to an enclosed litter tray. This arrangement does not address the problem of disposing of the soiled litter.

U.S. Pat. Nos. 5,168,834 and 5,577,462 disclose a two tray system to allow used litter to be separated and disposed of U.S. Pat. No. 6,095,088 discloses a rotatable sieve system. Many of the litter trays that automatically sift through pet litter are expensive and not considered to be cost effective.

When cats exit some existing litter trays they often carry litter and faecal matter on their paws and transport it to areas outside the tray.

U.S. Pat. Nos. 6,386,143 and 6,983,720 disclose cleaning ramps for cleaning a cats paws as it leaves the litter box.

After sifting through litter with a scoop, there is no specific place to store the contaminated scoop. U.S. Pat. No. 6,976,661 discloses a scoop holder for dealing with this problem.

To date no litter tray has been able to deal with all these problems in one single cost effective device.

It is an objective of this invention to provide an assembly for storing cat litter, which minimises the prior art limitations and provides a cost effective means of dealing with cat litter.

BRIEF DESCRIPTION OF THE INVENTION

To this end the present invention provides a pet litter device which includes
a) a tray to contain pet litter,
b) a pivoting lifting handle connected to the tray to assist in emptying used pet litter,
c) a ramp connectable to the tray to allow ingress and egress to the tray,
d) a skirt to fit to the perimeter of the tray and having an opening corresponding to the position of the ramp, and
e) an optional sifting scoop for removing pet litter.

In one form of the invention, the litter kit comprises a pivoting handle, fitted to and spanning across the width of the tray, and a single fixed handle at the rear. The pivoting handle is accessed by removing the skirt from the tray. The fixed handle is held by one hand and the pivoting handle is held by the other hand. The user is then able to empty the contents by tilting the tray.

The litter kit includes a ramp which is preferably positioned over the fixed handle on the tray. The ramp is lifted off the fixed handle when the litter is to be emptied. The ramp is preferably covered by a fabric or carpet to help remove litter from cat's feet when entering and existing the litter tray. Preferably the ramp contains a means to store a litter scoop. The ramp can be used with or without a liner fitted within the tray. The litter kit includes a skirt which is removable to access the pivoting handle for emptying the used litter. The skirt can be used with or without a liner fitted within the tray. The ramp and the skirt cover the edges of the tray during use by the pet to ensure that these areas are not contaminated with urine or faeces.

This invention provides an improved litter tray, which provides a means to store a litter scoop, a ramp for the cat to enter and exit on and clean the cat's paws, clean handles to allow the litter to be poured out, which is a more user-friendly, yet economical litter tray.

DESCRIPTION OF THE DRAWINGS

The invention will now be described with reference to the accompanying drawings, wherein:—

REFERENCE NUMERALS 50 litter kit
51 skirt
52 tray
53 ramp
54 scoop
55 fabric
56 retaining hooks (on ramp for scoop 54)
57 upper-side of ramp hook (on ramp 53)
59 pivoting handle (on tray 52)
60 slots (of tray 52)
61 pin (of handle 59)
62 expanded end (of slot 60)
63 connectors
64 tray perimeter (of tray 52)
65 outer skirt perimeter (of skirt 51)
66 fixed handle (of tray 52)
67 landing (of tray 52)
68 ribs (of handle 59)
69 upper cut-out (of skirt 51)
70 lower cut-out (of skirt 51)
71 ribs (of tray 52)
72 handle cap (of scoop 54)
73 wings (of connectors 63)
74 integrally molded assembly (skirt 51, ramp 53 and scoop 54)
75 single nested assembly (74+tray 52)
76 upper inside perimeter (of skirt 51)
77 lower inside perimeter (of skirt 51)
78 protruding edge (of tray 52)
79 horizontal member (or handle 59)
80 protruding front edge (of scoop 54)
81 scoop head (of scoop 54)
82 lower-side of ramp hook (of ramp 53)

DETAILED DESCRIPTION OF THE INVENTION

A preferred embodiment is illustrated in the drawings

Figure 1:
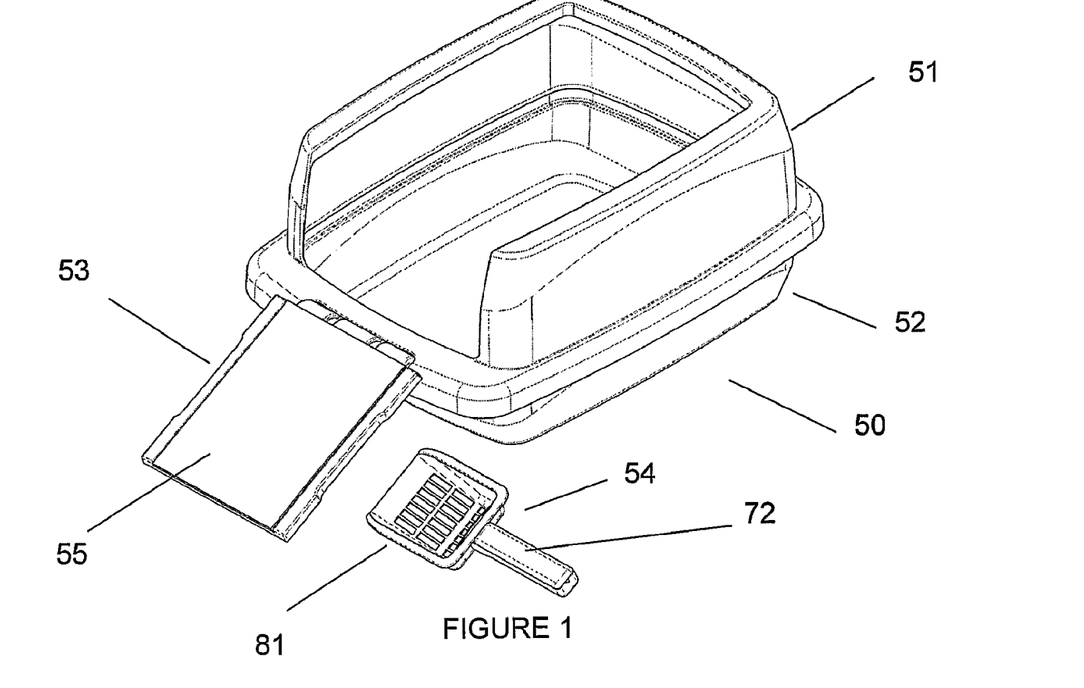
FIG. 1 is a perspective view of an assembled litter kit in accordance with the invention, with the scoop out of the ramp.

Litter kit 50 comprises a skirt 51, a tray 52 with fixed handle 66, a pivoting handle 59, a ramp 53 with fabric 55 and a scoop 54 with handle 72. In FIG. 1 skirt 51 is shown positioned on tray 52. Ramp 53 is shown positioned on tray 52, and fabric 55 is shown attached to ramp 53. The fabric is any suitable adherent fabric which will collect any adhered litter or dirt on the cat's paws. The fabric may be releasably attached to the ramp by any suitable arrangement including tacky adhesive.

Figure 2:
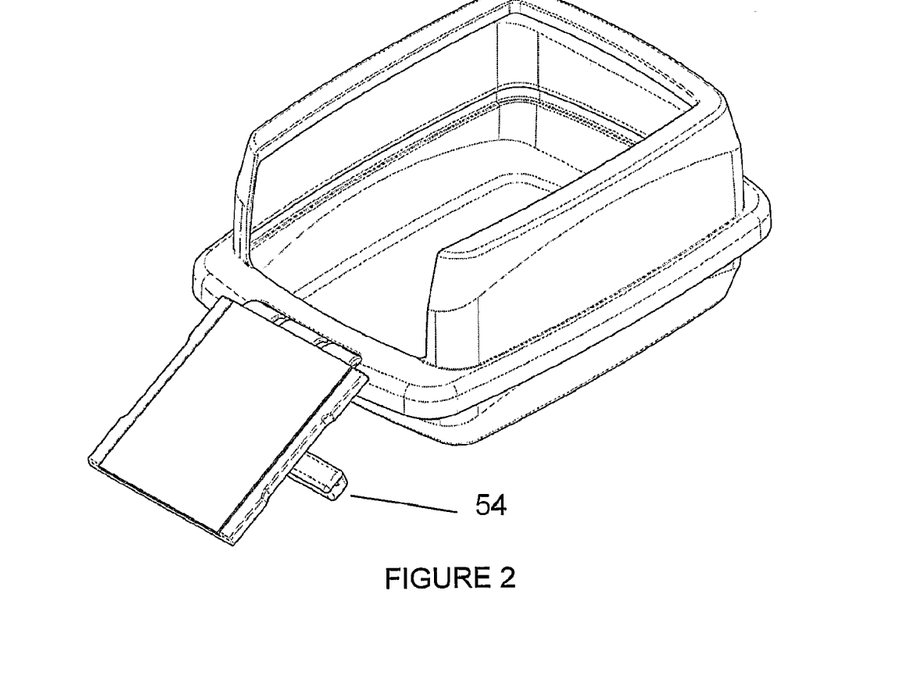
FIG. 2 is a perspective view of an assembled litter kit, with the scoop in the ramp.

In FIG. 2 the litter kit is shown with scoop 54 positioned under ramp 53. The attachment of the scoop under the ramp provides a convenient and hygienic storage place for the scoop.

The tray 52 is suitably shaped and profiled to contain kitty litter and accommodate cats, and can be made to any shape or size to effectively accommodate cats of different sizes. The bottom of the tray may contain a liner so that the litter can be easily disposed of. A liner is optional with this invention because the provision of the handles makes emptying much easier. By the provision of a handle on the tray and a scoop, this invention provides a less expensive solution than prior art designs requiring additional trays and filters for cleaning and disposal of litter is avoided.

A perimeter 64 (see FIG. 15) of tray 52 folds outwardly for some of the way around the top opening, providing strength and rigidity. As shown in FIGS. 1 to 4 the outwardly folded perimeter 64 of tray 52 seats in a corresponding recess of a skirt 51 (seen in FIG. 17).

Figure 12:
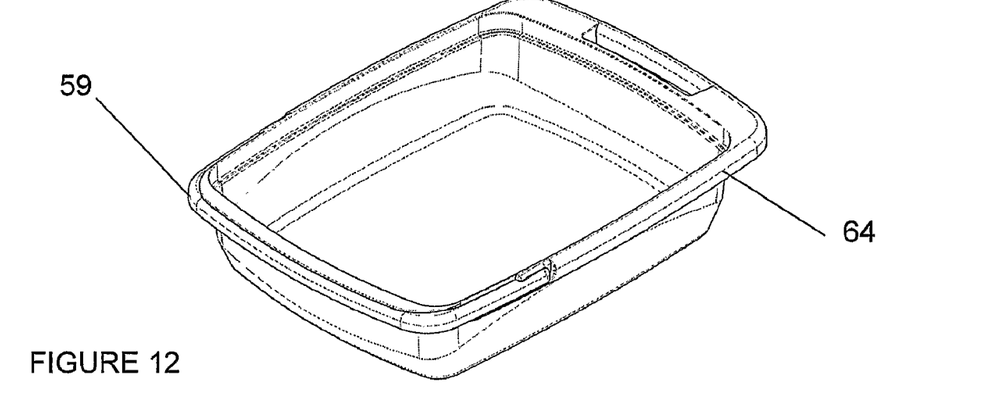
FIG. 12 is a perspective view of the tray with the pivoting handle attached and in the closed position.
Figure 13:
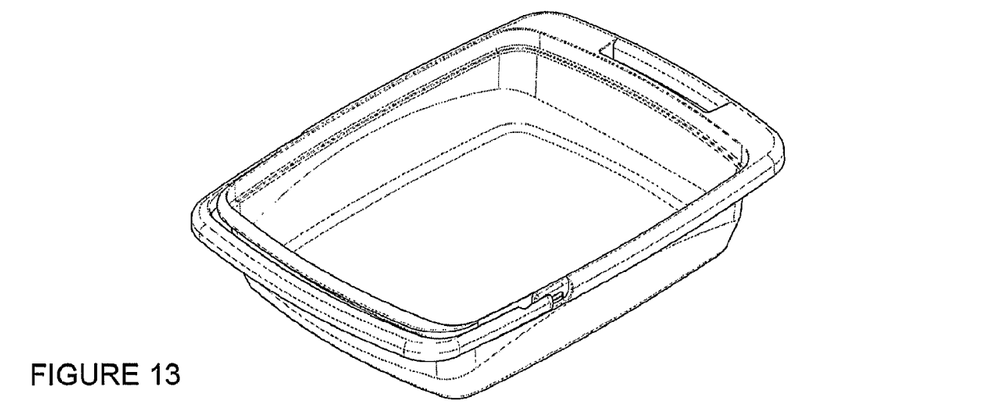
FIG. 13 is a perspective view of the tray with the pivoting handle attached and extended horizontally.
Figure 14:
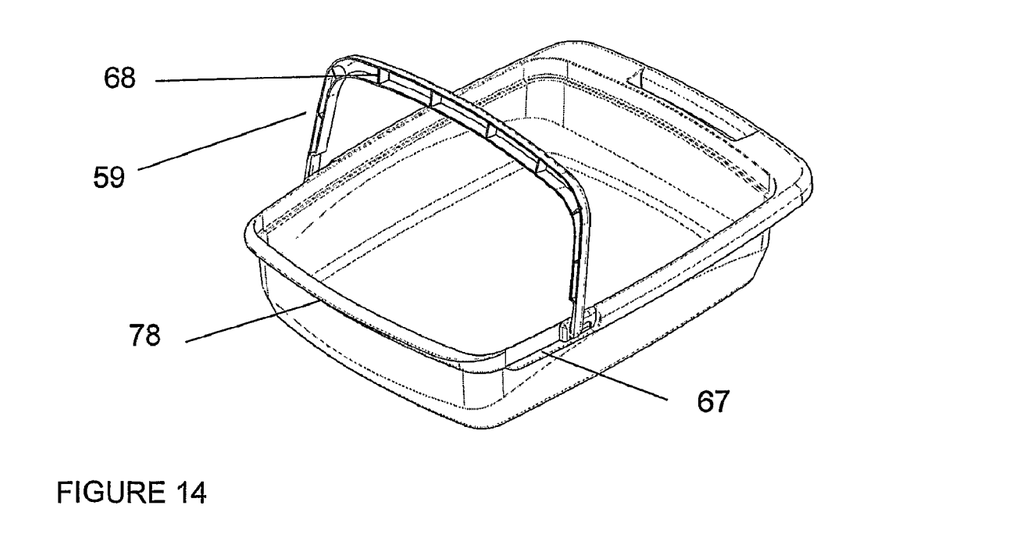
FIG. 14 is a perspective view of the tray with the pivoting handle attached and pivoted into the lifting position.

As shown in FIG. 14 landing 67 is provided on both sides of the tray to receive a pivoting handle 59. Landings 67 are sufficiently long to adequately support pivoting handle 59. Pivoting handle 59 can rotate within expanded end 62 and rest on landing 67 of tray 52. Tray 52 also includes a protruding edge 78 under which the handle 59 can nest when in its retracted position as shown in FIG. 12. The pivoting handle 59 spans the width of tray 52. Pivoting handle 59 comprises pins 61 which fit within slots 60 of tray 52. Pivoting handle 59 may contain ribs 68 to provide reinforcement. Pivoting handle 59 is typically c-shaped but may have other suitable shapes and profiles.

Figure 15:
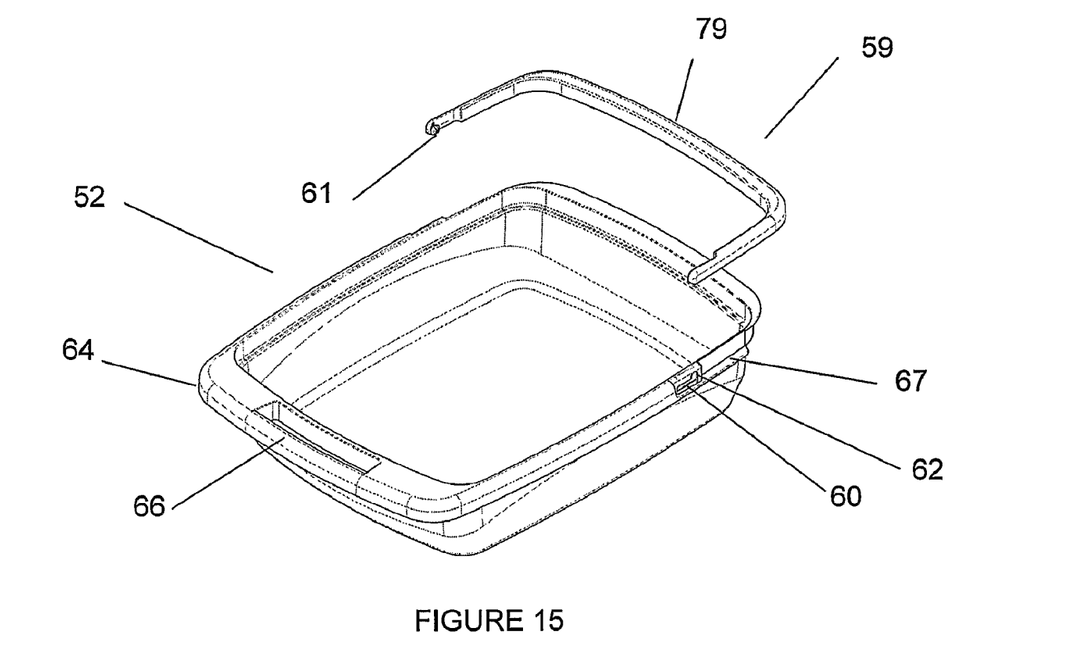
FIG. 15 is an exploded perspective view of the tray and the pivoting handle.

With reference to FIG. 15 the front of the tray 52 has a fixed handle 66 for the user to grip whilst lifting the tray 52. The fixed handle 66 is sufficiently long and wide to adequately accommodate the user's hand. The fixed handle 66 is positioned centrally across the width of tray 52 but could easily be provided in a different position. Two sides of the tray 52 include a slot 60 to receive a pin 61 on each side of pivoting handle 59. The tray 52 may contain ribs to reinforce the tray perimeter. Tray 52 is typically made from an injection mouldable plastic but can be constructed from any suitable material. Tray 52 can be manufactured using the process of injection molding or other suitable processes.

Figure 9:
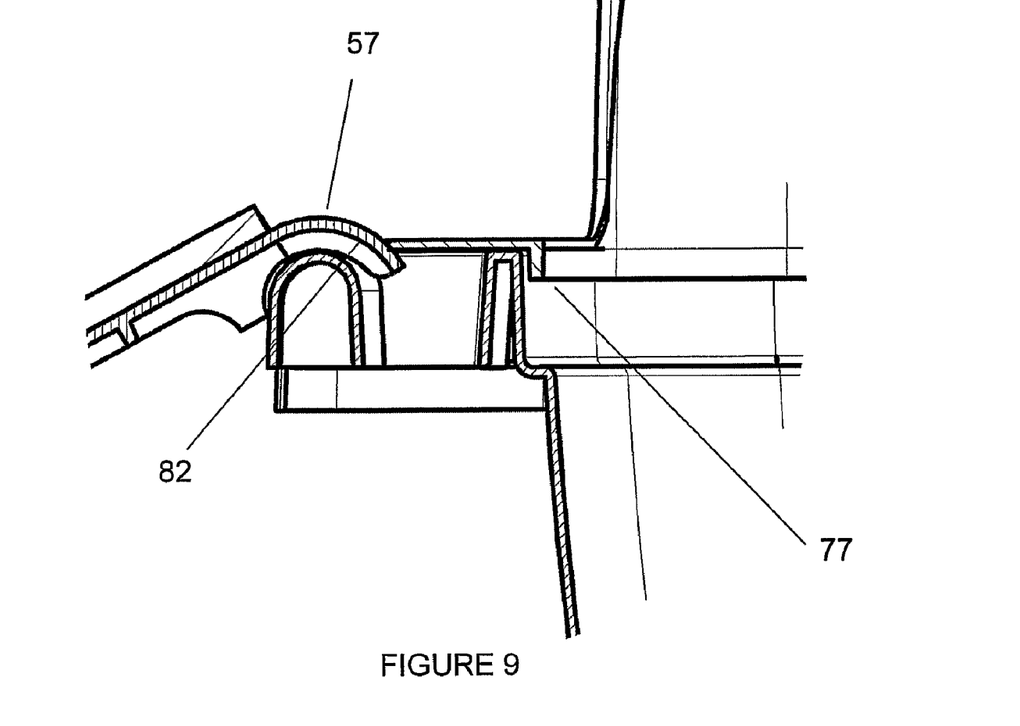
FIG. 9 is an enlarged view showing the ramp connection to the tray.
Figure 10:
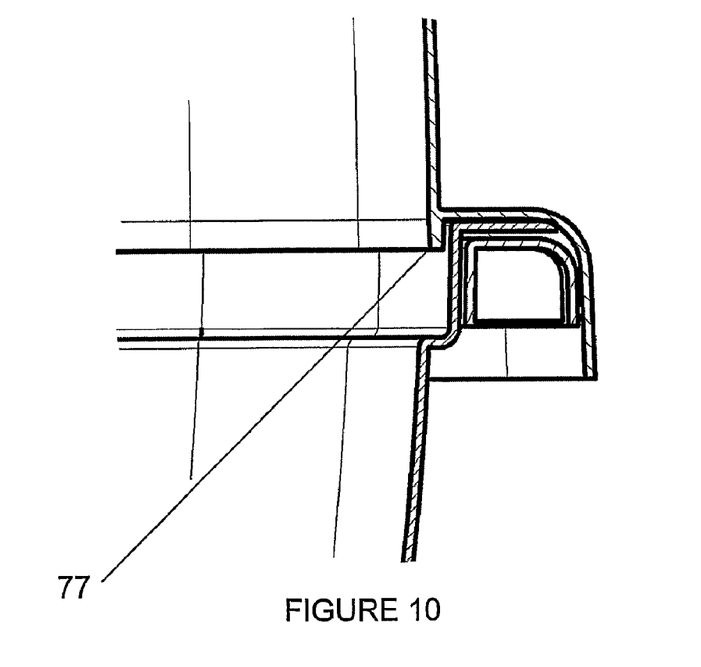
FIG. 10 is an enlarged view, showing the connection between the tray and skirt.
Figure 11:
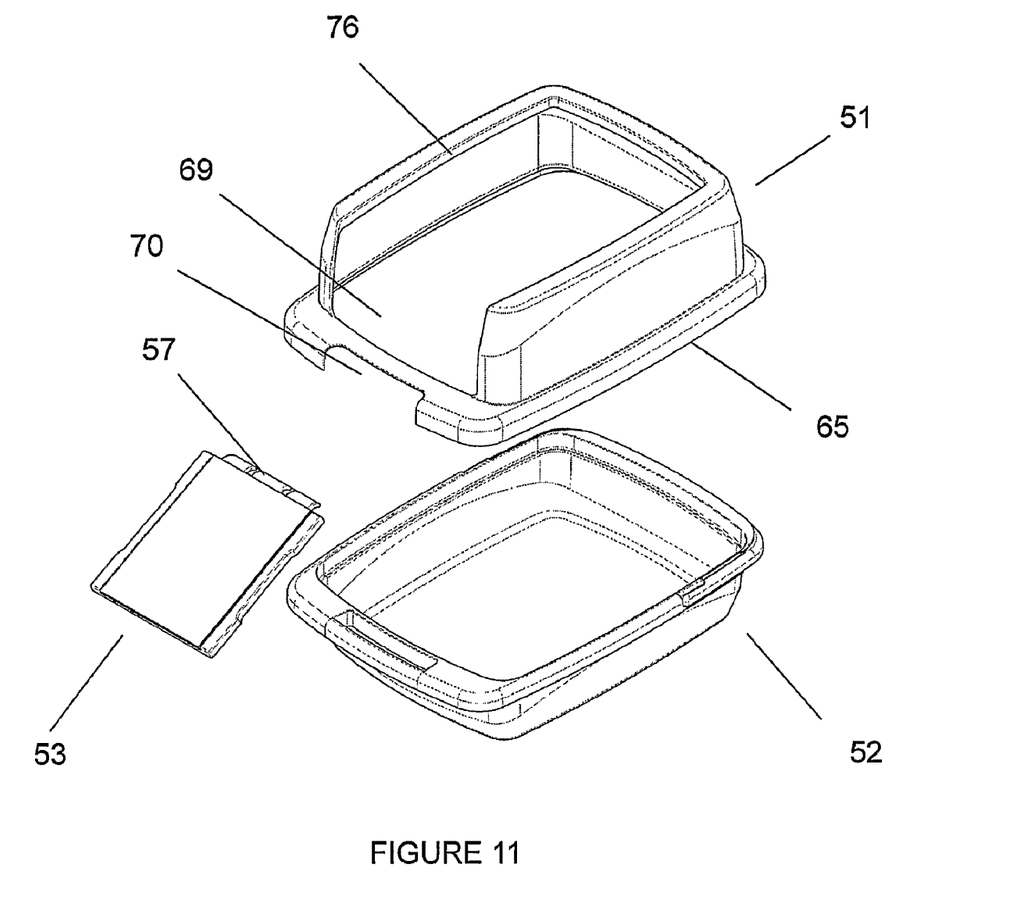
FIG. 11 is an exploded view of the litter kit, showing the ramp and skirt separated from the tray.

Skirt 51 is suitably shaped and profiled to fit on top of tray 52. Skirt perimeter 65 releasably engages over tray perimeter 64. Skirt 51 has an upper cut-out 69 (see FIG. 11) on one side to allow cats to easily enter and exit and a lower cut-out 70 to accommodate lower-side of ramp hook 82 of ramp 53 as shown in FIG. 9. The lower-side of ramp hook 82 of ramp 53 fits within the width of lower cut-out 70 of skirt 51. The skirt height is adequately high to give cats sufficient privacy and can be made to any shape or size to effectively cater for cats of different sizes. If needed a roof may be incorporated in the skirt 51 to reduce odour dispersal and for outdoor use. Skirt perimeter 65 is wide enough to cover the outside of tray 52. The flat edge around the perimeter 64 of tray 52 is also protected from cat urine because it is covered by inside perimeter 77 when the cat is urinating.

Figure 3:
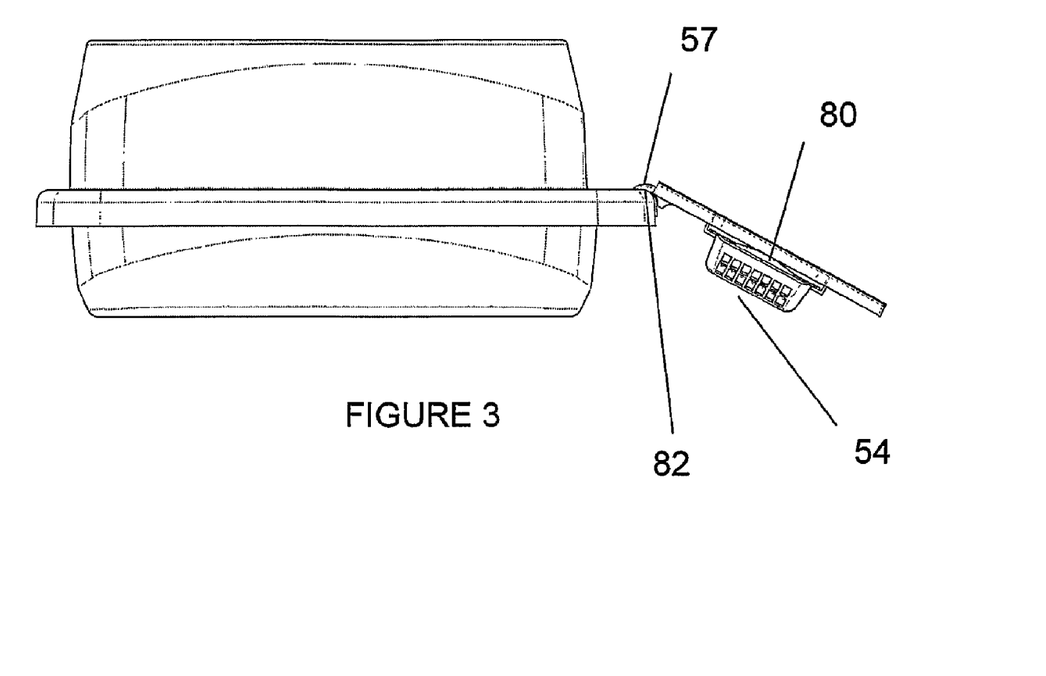
FIG. 3 is a side elevation of an assembled litter kit, with the scoop in the ramp.
Figure 4:
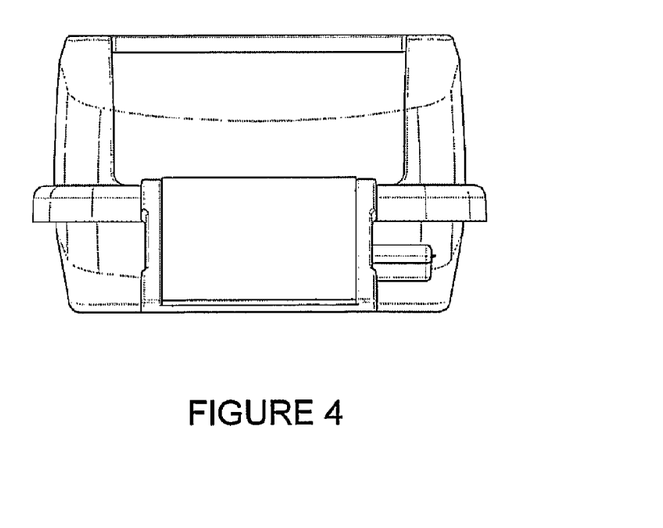
FIG. 4 is a front view of an assembled litter kit, with the scoop in the ramp.
Figure 5:
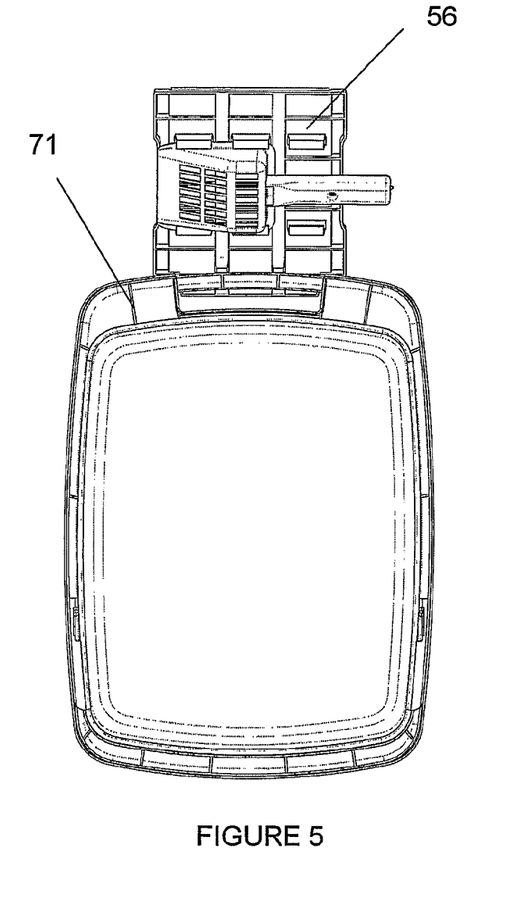
FIG. 5 is a bottom view of an assembled litter kit, with the scoop in the ramp.
Figure 6:
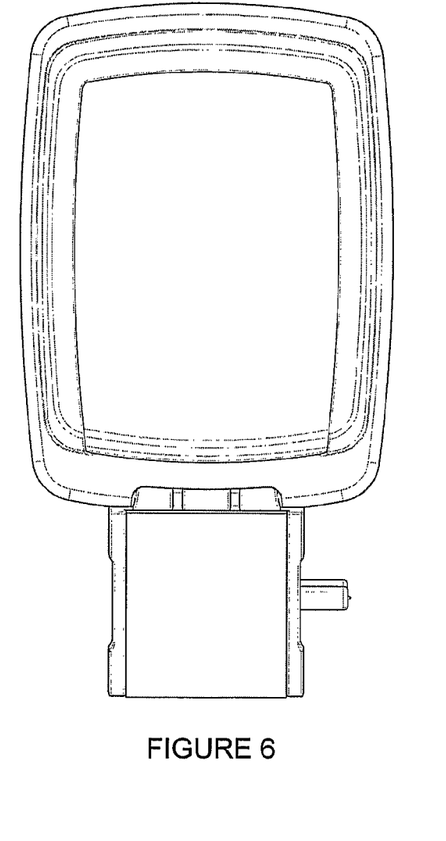
FIG. 6 is a top view of an assembled litter kit, with the scoop in the ramp.
Figure 7:
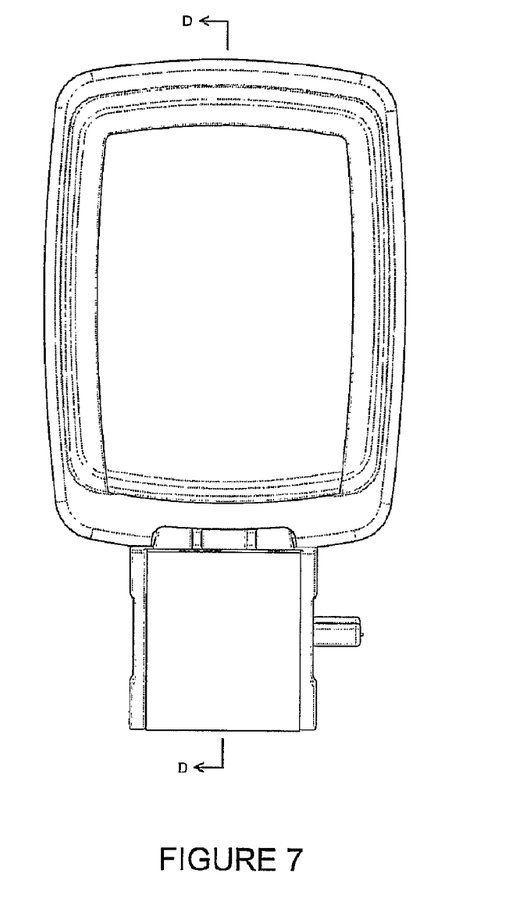
FIG. 7 is a top view of an assembled litter kit, with the scoop in the ramp, showing section arrows.
Figure 8:
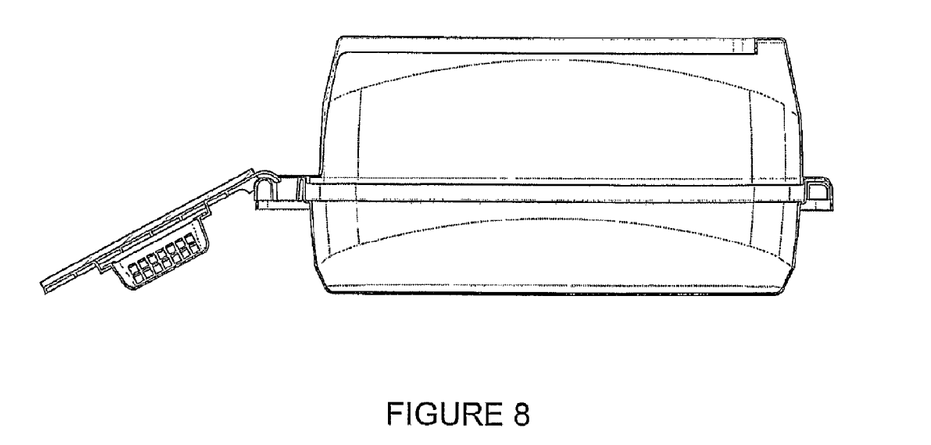
FIG. 8 is a cross-sectional view thereof, taken along line D-D in FIG. 7.

As shown in FIG. 1, ramp 53 engages with tray 52 and receives scoop 54. As shown in FIG. 5, the underside of ramp 53 comprises a plurality of retaining hooks 56 that engage scoop head 81 of scoop 54. Referring to FIG. 3 and FIG. 9, lower-side of ramp hook 82 of ramp 53 is sized and profiled to be positioned over fixed handle 66 of tray 52. The upper-side of ramp hook 57 protects fixed handle 66 from cat urine, so that the user does not get cat urine on their hands when lifting the tray. The top surface of ramp 53 is suitable for receiving fabric 55.

Referring to FIG. 1, the litter kit 50 includes scoop 54. The scoop handle comprises a cap 72 along the handle. The cap 72 is friction fitted into the handle by any suitable fastening means. The scoop head 81 contains slots to sift through cat litter and cat faeces. The handle is sufficiently long and wide to fit in the user's hand. The scoop is sufficiently long and wide to sift easily throughout tray 52 without being cumbersome. The scoop is sufficiently reinforced so that the handle or scoop doesn't flex too much. The number of slots in the scoop may be varied according to need. Referring to FIG. 3, scoop 54 has a protruding front edge 80 that restricts how far the scoop can be pushed in under the ramp.

Figure 17:
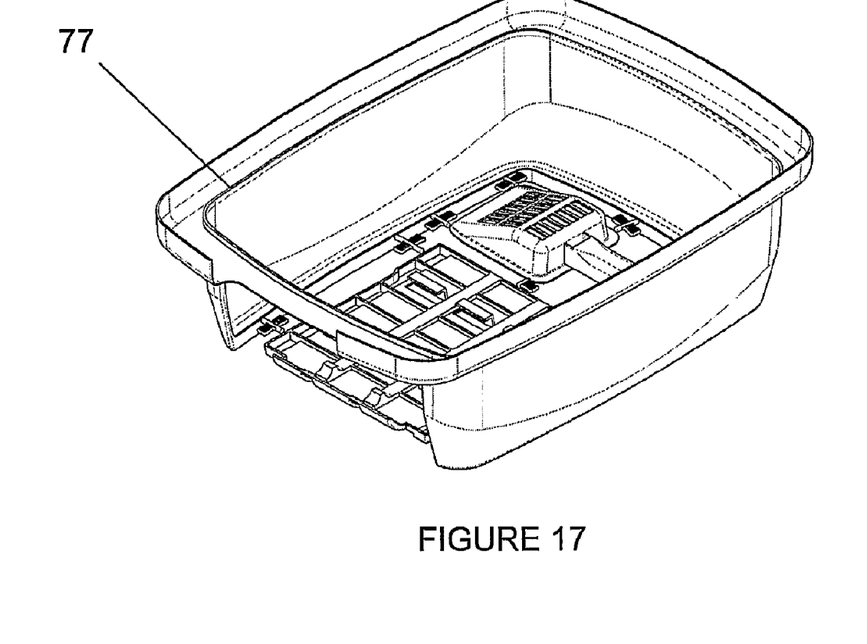
FIG. 17 is an upside-down perspective view of an integrally molded skirt, ramp and scoop.
Figure 18:
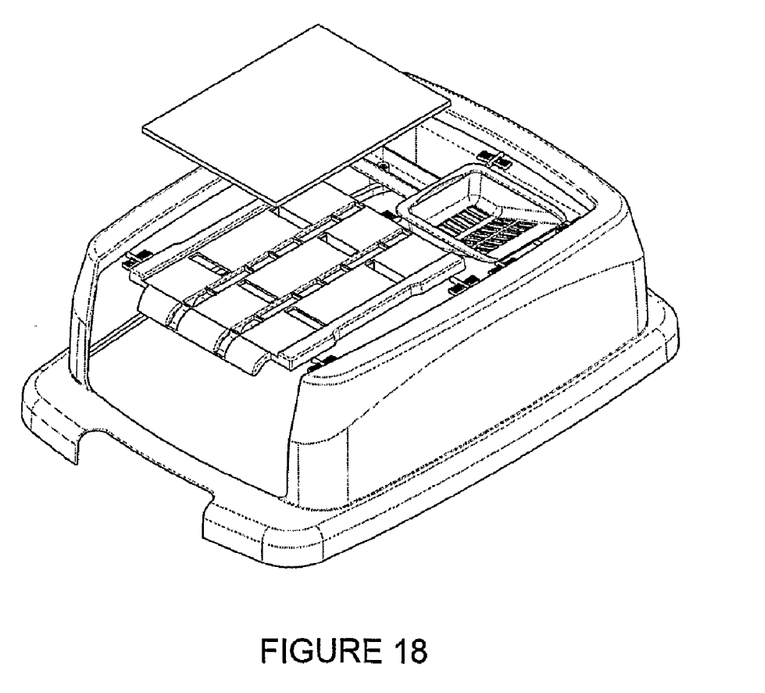
FIG. 18 is an exploded perspective top view of an integrally molded skirt, ramp and scoop, and ramp fabric.
Figure 19:
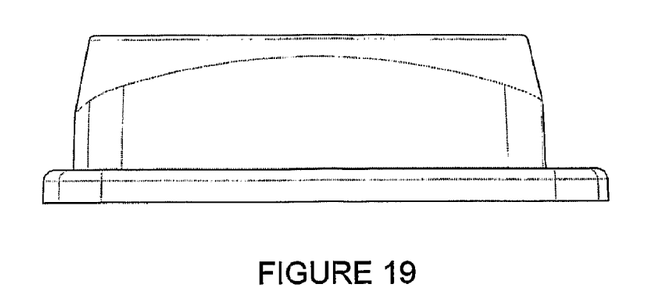
FIG. 19 is a side view of an integrally molded skirt, ramp and scoop.
Figure 20:
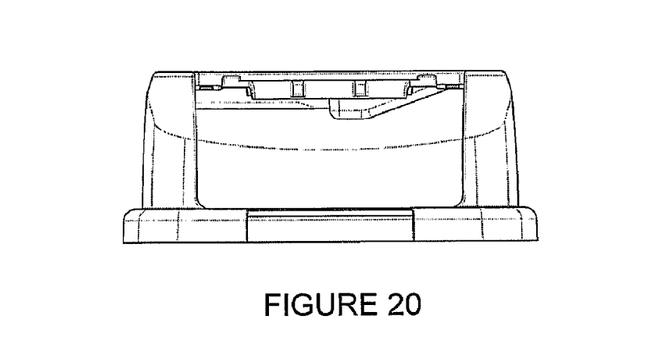
FIG. 20 is a front view of an integrally molded skirt, ramp and scoop.
Figure 21:
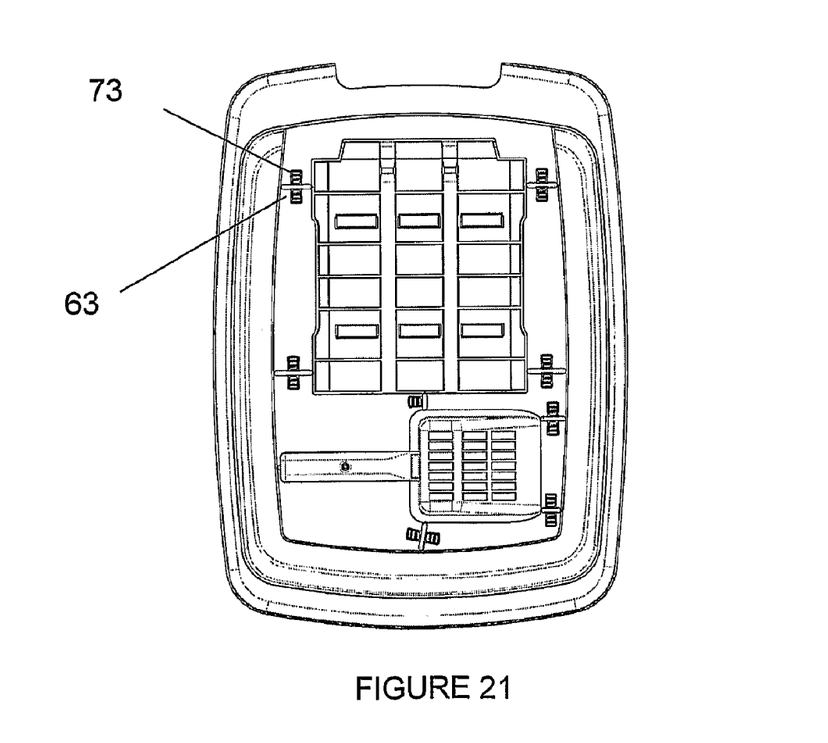
FIG. 21 is a bottom view of an integrally molded skirt, ramp and scoop.

As shown in FIGS. 17 and 18 the skirt handle and ramp may be made as an integrally molded assembly 74 comprising skirt 51, ramp 53 and scoop 54 shown connected by a plurality of connectors 63. The preferred material is either polypropylene copolymer or polyethylene. Connectors 63 comprise wings 73 to be gripped by the user's fingers. When wings 73 are twisted the ends of the connectors break hence separating the skirt 51, ramp 53 and scoop 54. Alternatively the connectors can simply be cut with scissors.

The connectors 63 are suitably positioned between the skirt 51, ramp 53 and scoop 54 to enable balanced flow of plastic during the injection molding process.

Figure 22:
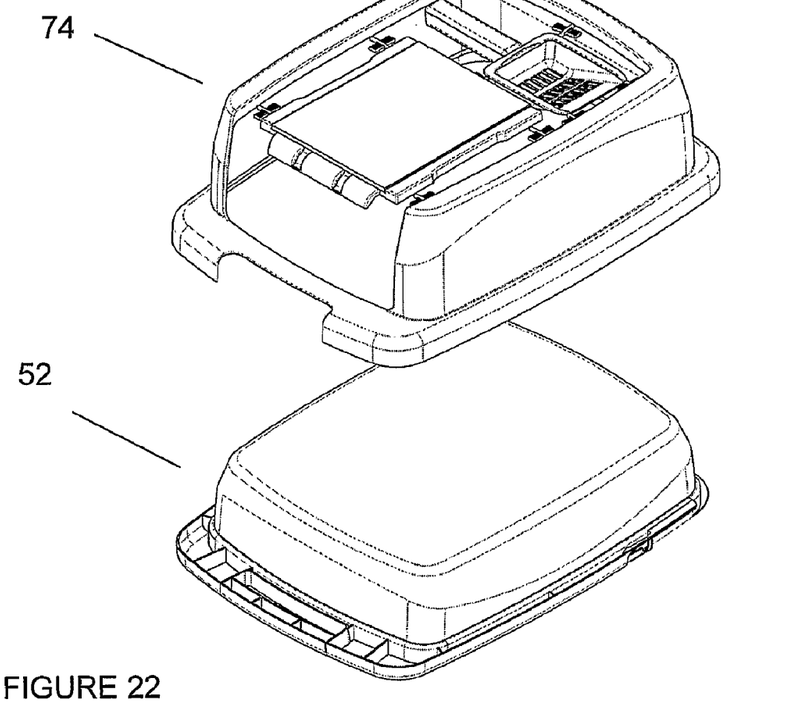
FIG. 22 is an exploded perspective view of the tray and an integrally molded skirt, ramp and scoop.
Figure 23:
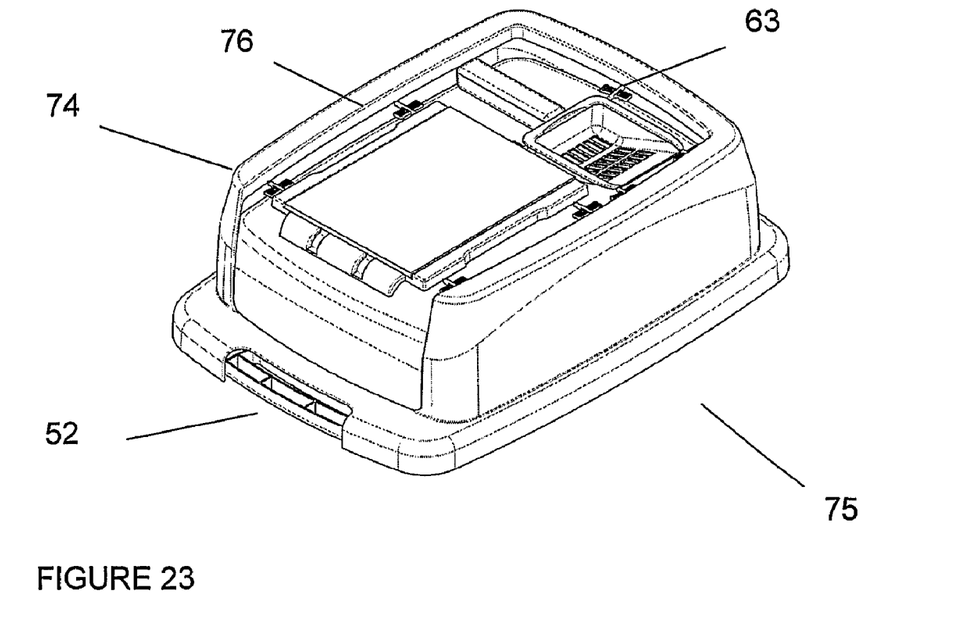
FIG. 23 is a perspective view of the nested tray and the integrally molded skirt, ramp and scoop.
Figure 24:
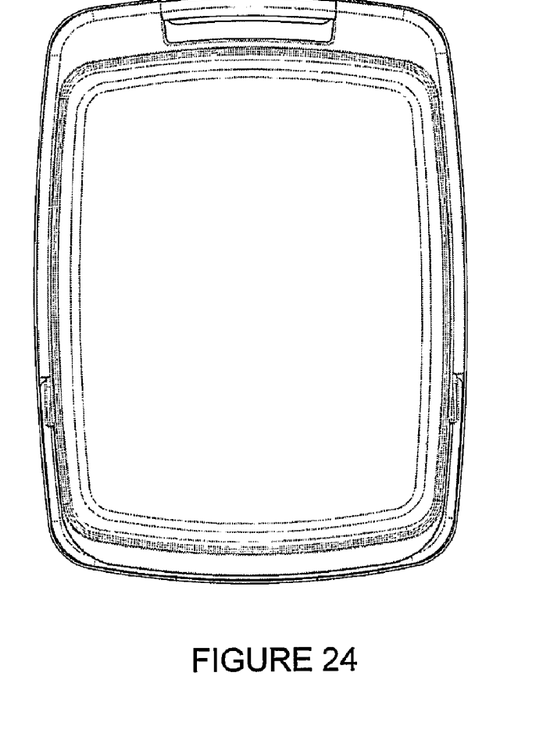
FIG. 24 is a plan view of the nested tray and the integrally molded skirt, ramp and scoop with the tray on top.
Figure 25:
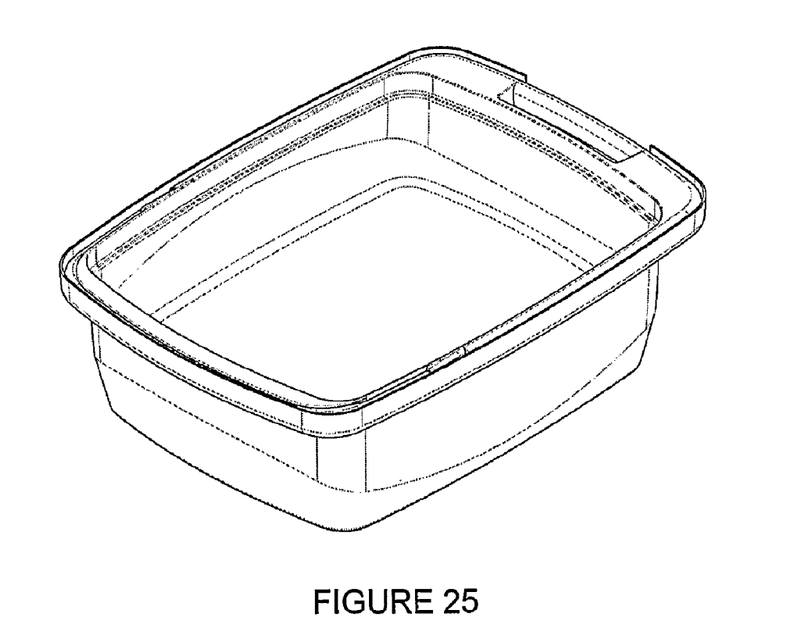
FIG. 25 is a perspective view of FIG. 24.
Figure 26:
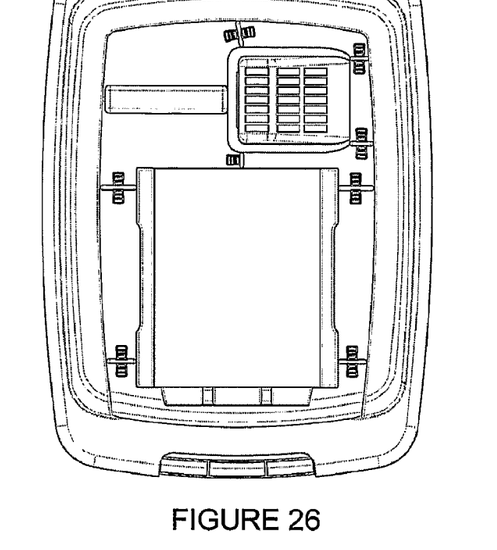
FIG. 26 is a top view of an integrally molded skirt, ramp (with fabric) and scoop.
Figure 27:
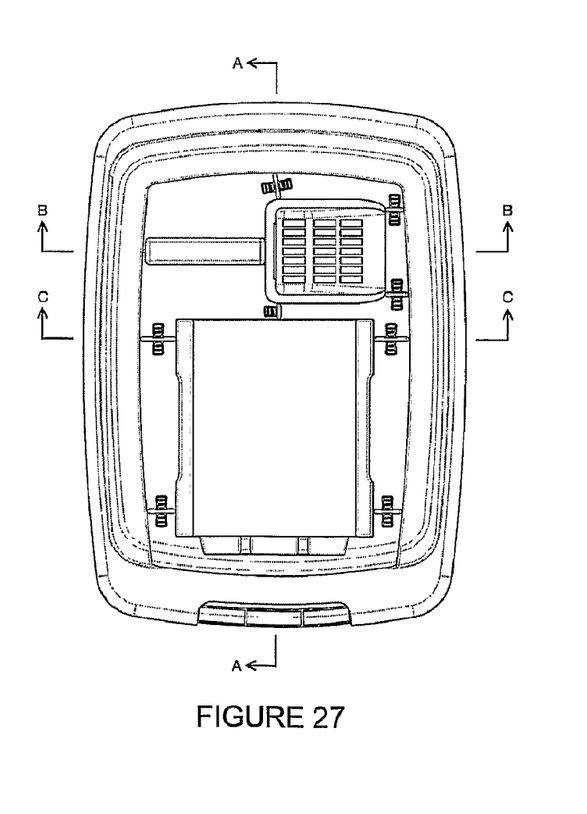
FIG. 27 is a top view of an integrally molded skirt, ramp (with fabric) and scoop, with section arrows.
Figure 28:
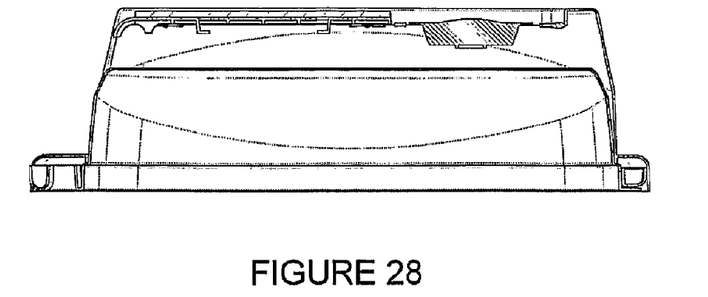
FIG. 28 is a section view of FIG. 27, taken along the line A-A.
Figure 29:
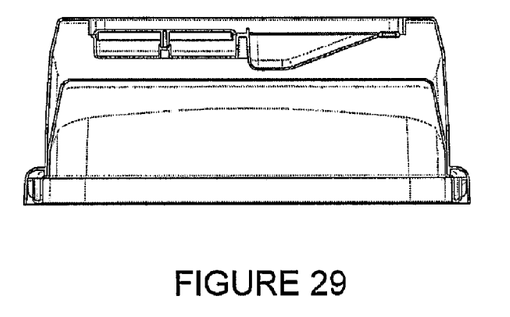
FIG. 29 is a section view of FIG. 27, taken along the line B-B.
Figure 30:
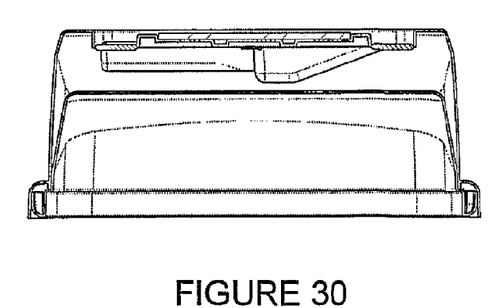
FIG. 30 is a section view of FIG. 27, taken along the line C-C.

This arrangement makes it easy to package the tray 52 with the integrally moulded skirt handle and ramp 74 as shown in FIGS. 22 and 23. A retail label can be positioned on the single nested assembly 75, viewed within the upper inside perimeter 76 of the skirt. The label isn't restricted to this position.

Figure 31:
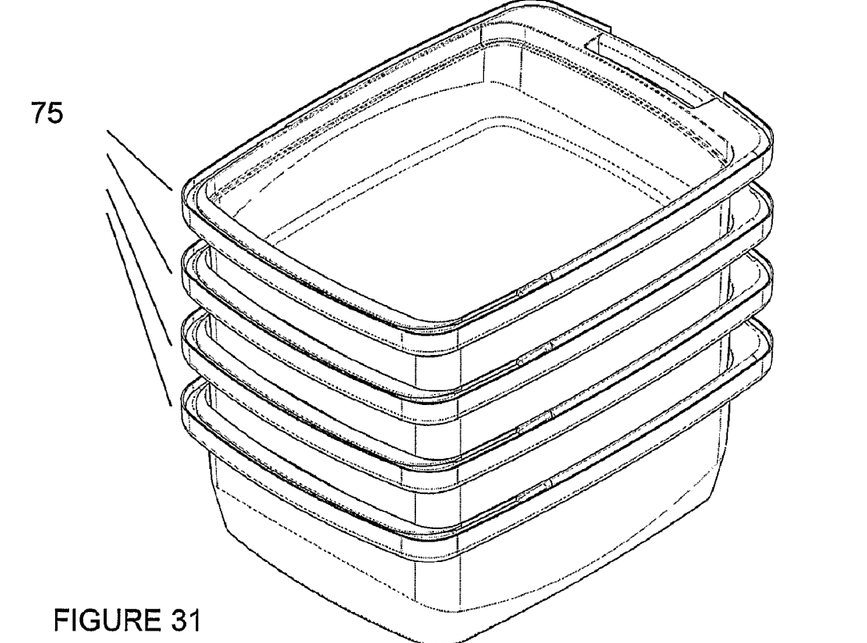
FIG. 31 is an upside-down perspective view of several nested tray and integrally molded skirt, ramp and scoop assemblies.
Figure 32:
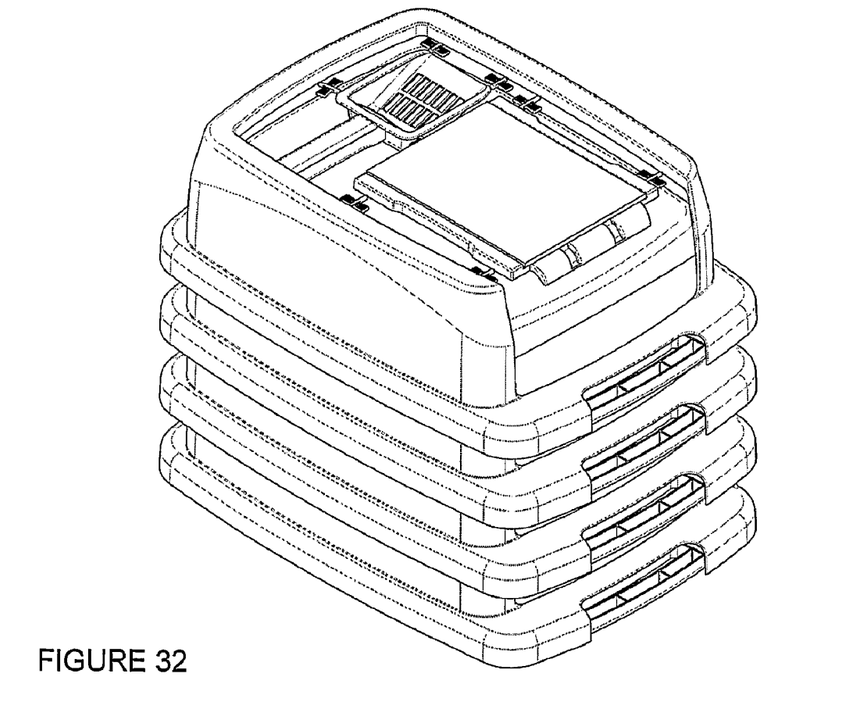
FIG. 32 is a perspective view of several nested tray and integrally molded skirt, ramp and scoop assemblies.
Figure 33:
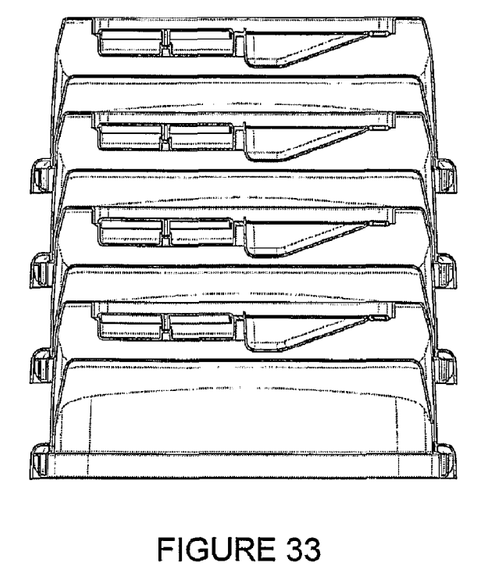
FIG. 33 is a lateral section view of FIG. 32.
Figure 34:
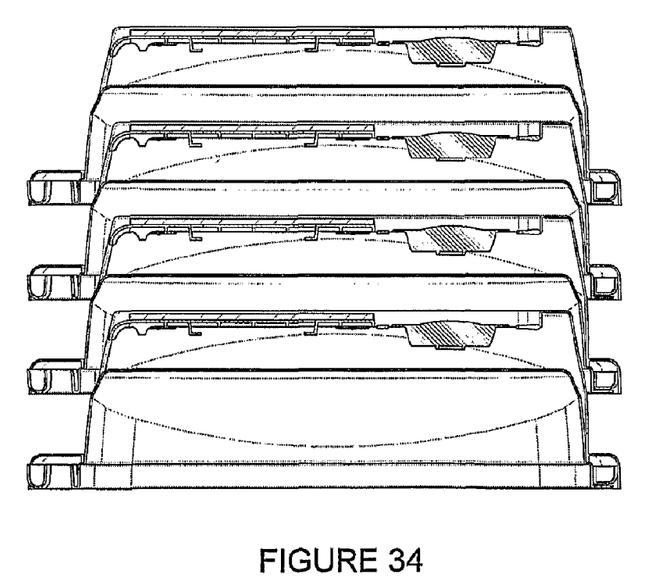
FIG. 34 is a longitudinal section view of FIG. 32.

FIGS. 31 and 32 shows several single nested assemblies 75 nested within one another. A label can be positioned on each single nested assembly 75. Each label becomes visible as each single nested assembly 75 is removed.

The litter kit is purchased by the user as a single nested assembly 75. The integrally molded assembly 74 is lifted out of the tray 52. The plurality of to connectors 63 are removed by rotating wings 73 by a sufficient number of revolutions to cause the connections joining skirt 51, ramp 53 and scoop 54 to break, hence separating skirt 1, ramp 53 and scoop 54. Pivoting handle 59 may be already factory connected to tray 52.

If the user decides not to use tray liners: Fresh kitty litter is poured into tray 52, skirt 51 is placed over tray 52 and ramp 53 is releasably engaged with fixed handle 66 of tray 52. Scoop 54 is guided into retaining hooks 56 on the underside of ramp 53 for storage. After the cat has used the tray, the faeces are sifted out using scoop 54. After use, scoop 54 is returned back under ramp 53 for storage.

When the user is ready to empty tray 52, ramp 53 is disengaged from tray 52 and skirt 51 is lifted off tray 52. Pivoting handle 59 is pulled horizontally along landings 67 so that pins 61 of pivoting handle 59 are aligned with expanded ends 62 of slots 60. Pivoting handle 59 cannot be rotated upwards until it is aligned with expanded slots 62 because a horizontal member 79 of pivoting handle 59 is blocked by protruding edge 78 of tray 52. Handle 59 is then rotated upwards from landing 67 of tray 52. The user grips fixed handle 66 with one hand and pivoting handle 59 with the other hand. The tray is pivoted by raising the end of tray 52 where fixed handle 66 is located to a high enough position to allow the used litter to pour out the end opposite fixed handle 66. The used kitty litter is poured into a bag or bin and disposed of. The handle 66 and edges of tray 52 are covered during use by the cat and are therefor able to be held by the owner when empty the tray. After emptying the used litter, pivoting handle 59 is rotated about the axis of the expanded ends 62 of slots 60. Horizontal member 79 of pivoting handle 79 passes protruding edge 78 of tray 52 and is positioned back on to landing 67 of tray 52.

Figure 16:
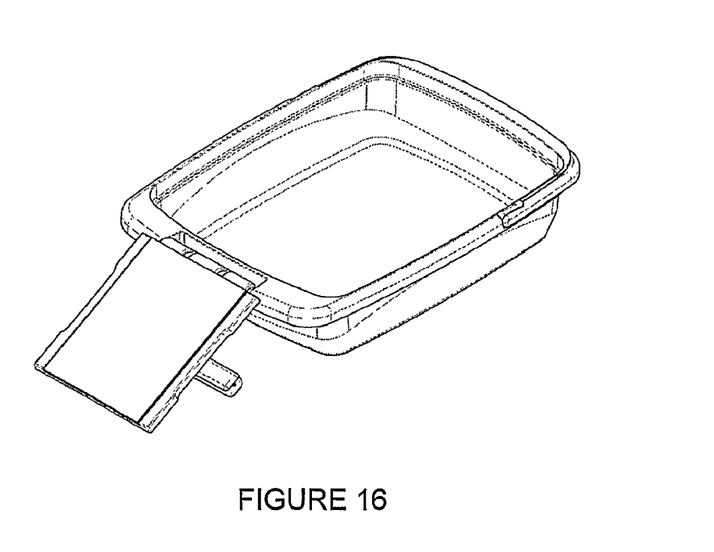
FIG. 16 is a perspective view of the tray with the ramp attached and the scoop positioned under the ramp.

Referring to FIG. 16, pivoting handle 59 is then pushed horizontally along landing 67 so that pins 61 slide within slots 60, hence the front of pivoting handle 59 is retained under protruding edge 78 of tray 52.

If the user decides to use liners: A liner is inserted into tray 52 which overhangs the outer perimeter of tray 52. New kitty litter is poured into tray 52, skirt 51 is placed over tray 52 and liner, and ramp 53 is releasably engaged with fixed handle 66 of tray 52 with the liner underneath. Scoop 54 is guided into retaining hooks 56 on the underside of ramp 53 for storage. After the cat has used the tray, the cat faeces are sifted out using scoop 54. After use, scoop 54 is returned back under ramp 53 for storage.

When the user is ready to empty tray 52, ramp 53 is disengaged from tray 52 and skirt 51 is lifted off tray 52. The liner is then tied up/sealed off, lifted out and disposed of.

Those skilled in the art will appreciate that the present invention provides a substantial advance in kitty litter trays, providing all of the herein described advantages without incurring any relative disadvantage. Those skilled in the art will realise that the invention can be implemented in other embodiments than those shown in the drawings without departing from the core teachings of the invention.

The invention claimed is:

1. A pet litter device which includes
   a) a tray to contain pet litter,
   b) a pivoting lifting handle connected to the tray to assist in emptying used pet litter said pivoting handle spanning the width of the tray and is foldable into a retracted position along the perimeter of one end of the tray,
   c) a fixed handle is provided at the end of the tray remote from said pivoting lifting handle,
   d) a ramp adapted to be attached to the tray to allow ingress and egress to the tray,
   e) a skirt adapted to be attached to the perimeter of the tray and having an opening corresponding to the position of the ramp, wherein the ramp and the skirt, when attached to the tray, cover the perimeter of the tray, the pivoting handle in the retracted position, and the fixed handle to prevent urine or feces contamination of the perimeter of the tray and the handles.

2. A pet litter device as claimed in claim 1 in which a sifting scoop for removing pet litter is detachably mounted on the underside of the ramp.

3. A pet litter device as claimed 2 in which the skirt, ramp and scoop are injection molded together and are detachably connected together prior to assembly with the tray.

4. A pet litter device as claimed in claim 3 in which the injection moulded skirt ramp and scoop nest with the tray prior to assembly for ease of storage.

5. A pet litter device as claimed in claim 1 in which the upper surface of the ramp is covered in a fabric that cleans the paws of the pet.

6. A pet litter device as claimed in claim 5 in which the ramp clamps onto the fixed handle.

7. A pet litter device as claimed in claim 1 in which the pivoting handle in the retracted position is retained under a protruding edge formed in the perimeter of one end of the tray.

* * * * *